United States Patent
Pedneau

(10) Patent No.: US 6,304,944 B1
(45) Date of Patent: *Oct. 16, 2001

(54) MECHANISM FOR STORING SYSTEM LEVEL ATTRIBUTES IN A TRANSLATION LOOKASIDE BUFFER

(75) Inventor: Michael Pedneau, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/723,553

(22) Filed: Nov. 27, 2000

Related U.S. Application Data

(63) Continuation of application No. 08/820,965, filed on Mar. 19, 1997, now Pat. No. 6,189,074.

(51) Int. Cl.$^7$ .................................................. G06F 12/00
(52) U.S. Cl. ............................ 711/139; 711/145; 711/207
(58) Field of Search .................................... 711/139, 145, 711/207, 136, 202, 203, 205

(56) References Cited

U.S. PATENT DOCUMENTS

| | | |
|---|---|---|
| 4,669,043 | 5/1987 | Kaplinsky . |
| 4,700,291 | 10/1987 | Saito . |
| 5,060,137 | 10/1991 | Bryg et al. . |
| 5,623,619 | 4/1997 | Witt . |
| 5,671,444 | 9/1997 | Akkary et al. . |
| 5,680,572 | 10/1997 | Akkary et al. . |
| 5,751,996 | 5/1998 | Glew et al. . |
| 5,752,274 | 5/1998 | Garibay, Jr. et al. . |
| 5,761,691 | 6/1998 | Witt . |
| 5,895,501 | 4/1999 | Smith . |
| 5,924,125 | 7/1999 | Arya . |
| 6,189,074 | * 2/2001 | Pedneau .............................. 711/139 |

FOREIGN PATENT DOCUMENTS

2210479 A  7/1989  (GB) .

OTHER PUBLICATIONS

Hennessy, John L., & David A. Patterson, *Computer Architecture: A Quantitative Approach,* Morgan Kaufmann Publishers, Inc., San Mateo, CA, 1990.
*Pentium Pro Family Developer's Manual vol. 3: Operating System Writer's Manual,* Intel, 1996.

\* cited by examiner

*Primary Examiner*—Matthew Kim
*Assistant Examiner*—Matthew D. Anderson
(74) *Attorney, Agent, or Firm*—Conley, Rose & Tayon, PC; Lawrence J. Merkel

(57) ABSTRACT

A method and apparatus for improving the efficiency of the cacheability (and other attribute) determination by making the information from the region register available during linear to physical address translation, rather than serially upon completion of the address translation. Address range comparisons are made when the TLB is loaded. That is, attribute information stored in a region register or registers is compared with physical addresses corresponding to translations loaded in a translation lookaside buffer reload operation. The present invention thus advantageously removes the region register compare operation from the path to memory.

18 Claims, 9 Drawing Sheets

TWO LEVEL PAGING SCHEME

| 31 | | 12 | 11 | 10 | 9 | 8 | 7 | 6 | 5 | 4 | 3 | 2 | 1 | 0 |
|---|---|---|---|---|---|---|---|---|---|---|---|---|---|---|
| PAGE TABLE ADDRESS 31..12 | | | OS RESERVED | | | 0 | 0 | D | A | PCD | PWT | U-S | R-W | P |

Page Directory Entry (Points to Page Table)

| 31 | | 12 | 11 | 10 | 9 | 8 | 7 | 6 | 5 | 4 | 3 | 2 | 1 | 0 |
|---|---|---|---|---|---|---|---|---|---|---|---|---|---|---|
| PAGE FRAME ADDRESS 31..12 | | | OS RESERVED | | | 0 | 0 | D | A | PCD | PWT | U-S | R-W | P |

PAGING OPERATION

TRANSLATION LOOKASIDE BUFFER

MECHANISM FOR STORING SYSTEM LEVEL ATTRIBUTES IN A TRANSLATION LOOKASIDE BUFFER

This application is a continuation of Ser. No. 08/820,965 filed Mar. 19, 1997, now U.S. Pat. No. 6,189,074.

FIELD OF THE INVENTION

The present invention relates to a method and apparatus for improving the efficiency of memory accesses in computer systems, and more specifically, to a method and apparatus for providing cacheability information during linear to physical address translation.

BACKGROUND OF THE INVENTION

A cache memory is a high speed memory unit interposed in the memory hierarchy of a computer system between a slower system memory and a processor to improve effective memory transfer rates and accordingly improve overall system performance. The cache memory unit is essentially hidden and appears transparent to the user, who is aware of only a larger system memory. The cache is usually implemented in static random access memory (SRAM) which has speeds comparable to that of the processor, while the system memory is implemented in less expensive, slower random access memory (RAM).

The cache concept anticipates the likely re-use by the microprocessor of selected data in system memory by storing a copy of the selected data in the cache memory. As such, not all memory regions are desired to be cacheable. For example, memory that is not likely to be re-used need not be cached. Accordingly, computer systems typically provide a region register on board the processor that contains system level attributes assigned to addresses within the region. For example, the cacheability of the region may be defined. The region register can also include information such as whether a given page is write-through or protected, etc.

For processors having an on-chip region register, processing the cacheability information typically proceeds as shown in FIG. 1. When an instruction requests the contents of a memory location, the instruction refers to the location not by an actual hardware or physical memory address, but by a "virtual" or "logical" address. The logical address is merely a name for a memory location which must then be translated into the appropriate physical memory location. The segmentation unit in the processor's memory management unit (MMU) translates the logical address into a linear address. If paging is not enabled, the linear address then becomes the physical address that is actually output from the processor to access the requested memory location, as shown. If paging is enabled, the paging mechanism further translates the linear address into a physical address which is then used to access the requested memory location. Prior to being used for accessing the memory, however, the physical address is compared to the cacheability ranges stored in the region register. This is a relatively slow serial process which degrades system performance. Accordingly, there is a need for a system and method for improving the cacheability determination so as to enhance system performance.

A more detailed discussion of the address translation process is deemed appropriate. Referring now to FIG. 2, in protected mode, each block or segment of memory is described by a structure called a segment descriptor. Segment descriptors reside in a set of system tables called descriptor tables. The segment and offset registers hold values referred to as a selector and offset, respectively, which are used to access one or more addresses in a desired memory segment. In essence, the selector is a 16 bit value that serves as the virtual name for a memory segment, and the MMU uses the selector to index in the descriptor tables to the respective segment descriptor corresponding to the desired memory segment.

As shown in FIG. 3, a descriptor is a small block of memory that describes the characteristics of a much larger memory block or memory segment. The descriptor includes information regarding the segment's base address, its length or limit, its type, its privilege level and various status information. The segment's base address is the starting point in the segment's linear address space. As shown in FIG. 2, the logical address is added to the base address to generate the linear address of the desired memory segment. The limit field is a 20 bit field that determines the last addressable unit of the memory segment. The segment type field is a 3 bit field which indicates the type of segment being defined, for example, a code, data, or stack segment. The privilege level field is a two bit field which indicates the level of privilege associated with the memory segment defined by the descriptor. Among the status bits, a bit referred as the Accessed bit is automatically set by the CPU whenever a memory reference is made to the segment defined by the respective descriptor.

The Intel X86 family of processors also include segment descriptor cache registers for each of its segment registers. Whenever a segment register's contents are changed, the 8-byte descriptor associated with that selector is automatically loaded (cached) on the chip. This is referred to as a segment descriptor reload. Once loaded, all references to that segment use the cached descriptor information instead of reaccessing the descriptor from main memory.

Referring again to FIG. 2, once the segmentation unit has translated the logical address into a linear address, if paging is enabled, the linear address is provided to the paging mechanism to be translated into a physical address. Referring now to FIG. 4, the CPU uses a directory and a page table to translate the linear address (from the segmentation unit) into a physical address. The CPU also includes an internal register referred to as control register 3 (CR3) which also contains the physical starting address of the page directory. The lower 12 bits of CR3 are always zero to ensure that the page directory is always page aligned. As shown in FIG. 4, the linear address produced by the segmentation unit includes a directory field which stores an index to the page directory. As shown, the directory value in the linear address is combined with the page directory base address in CR3 to index to the desired entry in the page directory.

The page directory is four Kbytes long and allows up to 1024 page directory entries. The contents of a Page Directory Entry are shown in FIG. 5. Each Page Directory Entry contains the base address of a respective page table as well as information about the respective page table. As shown in FIG. 4, the page table base address stored in the respective Page Directory Entry is combined with a page table index value stored in bits 12–21 of the linear address. The page table index value is used to select one of the 1024 page table entries.

Each page table is four Kbytes and holds up to 1024 page table entries. As shown in FIG. 6, a Page Table Entry contains the starting or base address of the page frame being accessed as well as statistical information about the page. As shown in FIG. 4, the frame base address in the Page Table Entry is concatenated with the lower 12 bits of the linear address, referred to as the offset, to form the physical address. The physical address is output from the pins of the CPU to access the desired memory location.

Referring again to FIGS. 5 and 6, the lower 12 bits of each Page Table Entry and Page Directory Entry contain statistical information about pages and page tables respectively. The P or Present bit, bit 0, indicates if a Page Directory or Page Table Entry can be used in address translation. The A or Accessed bit, bit 5, is set by the processor for both types of entries before a read or write access occurs to an address covered by an entry. For a Page Table Entry, the D or Dirty bit, bit 6, is set to 1 before a write to an address covered by that Page Table Entry occurs. The D bit is undefined for Page Directory Entries. When the P, A and D bits are updated by the microprocessor, the processor generates a Read-Modify-Write cycle which locks the bus and prevents conflicts with other processors or peripherals. The 3 bits marked "OS Reserved" in FIGS. 5 and 6 (bits 9–11) are software definable. Users are free to use these bits for any desired purpose they wish. An example use of the OS Reserved bits would be to store information about page aging. By keeping track of how long a page has been in memory since being accessed, an operating system can implement a page replacement algorithm like Least Recently Used. The (User/Supervisor) U/S bit 2 and the (Read/Write) R/W bit 1 are used to provide protection attributes for individual pages.

The paging mechanism described above is designed to support demand paged virtual memory systems. However, performance would degrade substantially if the processor was required to access two levels of tables for every memory access. To solve this problem and increase performance, the MMU paging mechanism uses an internal cache memory called the Translation Lookaside Buffer (TLB) which stores the most recently accessed translation entries. For example, the TLB may be a four-way set associative cache, meaning that the cache includes four banks of memory where a particular translation entry can be stored. The TLB may also include a least recently used (LRU) replacement algorithm for adding new translation entries if the TLB is currently full. The least recently used entry is replaced by a new entry because statistically the LRU entry is the least likely to be requested in the future. Therefore, the TLB automatically keeps the most commonly used translation entries stored in the processor. It is noted that the translation entries stored in the TLB are not necessarily the same as the Page Table Entries stored in memory. More particularly, the translation entries stored in the TLB can include the same, or more or less information than that stored in memory. It need not include, for example, statistical information, but must include the address entry. Generally, the translation entry includes enough information to generate a physical address given the linear address, as well as to implement any protections included in the Page Table Entries and Page Directory Entries. For example, the cacheability of the page as determined by the Page Table Entries (i.e. the PCD bit) may be stored in the TLB.

When the MMU requests a translation of a particular linear address and the corresponding translation entry resides in the TLB, then a TLB hit occurs and the entry is retrieved from the TLB without requiring a bus cycle or table lookups. However, if the requested translation does not reside in the TLB, then the requested entry is retrieved from the page tables in system memory and placed in the TLB.

Referring now to FIG. 7, the paging mechanism operates in the following fashion. When the paging mechanism receives a linear address from the segmentation unit, the upper 20 bits of the linear address are compared with the entries in the TLB to determine if there is a match. If there is a match (referred to as a TLB hit), then the 32-bit physical address is calculated using the page frame base address stored in the translation entry and the offset from the linear address as described above. The physical address is then compared to the data in the region register to determine whether the addressed data are cacheable.

If the requested translation is not in the TLB, then the CPU reads the appropriate Page Directory Entry from memory. If the present bit in the Page Directory Entry indicates that the page table is in memory, then the CPU calculates the Page Table Entry address, reads the appropriate Page Table Entry, and sets the Accessed bit. If the present bit in the Page Table Entry indicates that the requested page frame is in main memory, then the processor updates the Accessed and Dirty bits as needed and performs the memory access. The upper 20 bits of the linear address are stored in the TLB for future accesses. If the present bit for either the Page Directory Entry or the Page Table Entry indicates that these entries are not in memory, then the processor generates a page fault which potentially means that the requested page frame must be swapped in from disk.

SUMMARY OF THE INVENTION

The present invention comprises a method and apparatus for improving the efficiency of the cacheability determination by making the information from the region register available during linear to physical address translation, rather than serially upon completion of the address translation. More particularly, address range comparisons are made when the TLB is loaded. That is, addresses ranges represented in a region register or registers are compared with physical addresses during a translation lookaside buffer reload operation. Cacheability information determined from the comparison is stored in the translation entry. The present invention thus advantageously removes the cacheability compare operation from the path to memory. In addition to cacheability, the region register may store other attributes assigned to the defined region. These attributes may be represented in the translation entry as well.

A computer system according to the present invention includes a bus, a cache memory and a main memory operatively coupled to the bus. The main memory is configured to store a plurality of page tables, each of the plurality of page tables including a plurality of page table entries. A processor coupled to the bus includes a TLB configured to store a predetermined number of the translation entries, as well as attributes of the corresponding page as assigned via the region registers.

A method for providing cacheability information in a computer system during a translation lookaside buffer (TLB) reload cycle according to the present invention includes receiving a linear address and determining if the linear address corresponds to data stored in the TLB. The method further includes reading a Page Directory Entry if the linear address does not correspond to data stored in the TLB and, further, determining whether a page table identified by the Page Directory Entry resides in main memory. If the page table does in fact reside in main memory, the Page Table Entry will be read, along with a page frame identified in the entry. A cacheability compare operation on the page frame will be run. Finally, a physical address corresponding to the Page Table Entry will be calculated.

A paging mechanism according to one embodiment of the present invention includes receiving a linear address received from a segmentation unit. The upper twenty bits of the linear address are compared with the entries in the TLB to determine if there is a match. If there is a match, referred to as a TLB hit, a cacheabillty status bit will be read and processed. Next, the CPU will calculate a 32-bit physical address using the page frame base address stored in the translation entry and the offset from the linear address. The CPU will further initiate a bus cycle and place the address on the bus. If the requested translation entry is not in the TLB, a TLB reload will be performed. In a TLB reload cycle, the CPU reads the appropriate Page Directory Entry from memory. The Present bit in the Page Directory Entry is read to determine if the page table is in memory. If the Present bit is 0, indicating that the page table is not in memory, then a page table fault will be generated, which generally causes the requested entry or page frame to be swapped in from disk. If the page table is in fact in main memory, the CPU will set the Accessed bit in the Page Directory Entry. The CPU will then calculate the Page Table Entry address to access the appropriate Page Table Entry and will access the Page Table Entry. If the Present bit in the Page Table Entry is 0, indicating that the requested page frame is not in main memory, the processor will generate a page fault which, as discussed above, potentially means that the data will be swapped in from disk. If, however, the Present bit is set to 1, indicating that the page frame is present in main memory, the CPU will update the Accessed and/or Dirty bits as necessary, and the cacheability unit will perform a cacheability compare to determine whether or not the data at the desired location are cacheable. If the data are cacheable, the cacheability bit will be set and the translation entry will be stored in the TLB. Once the TLB has been updated, the cacheability bit will be read, the physical address will be generated, and a memory cycle will be initiated.

BRIEF DESCRIPTION OF THE DRAWINGS

A better understanding of the present invention can be obtained when the following detailed description of the preferred embodiment is considered in conjunction with the following drawings, in which.

Figure 1:
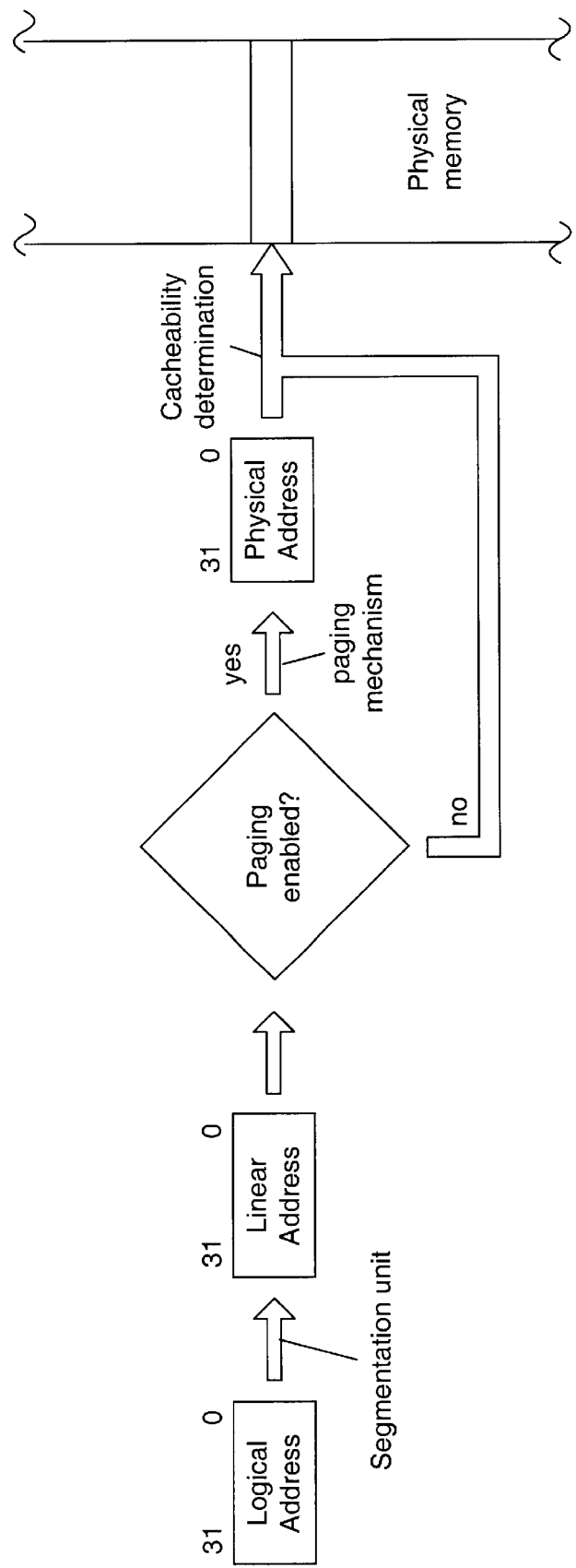
FIG. 1 illustrates the address translation and cacheability determination that occurs in the memory management unit according to the prior art.
Figure 2:
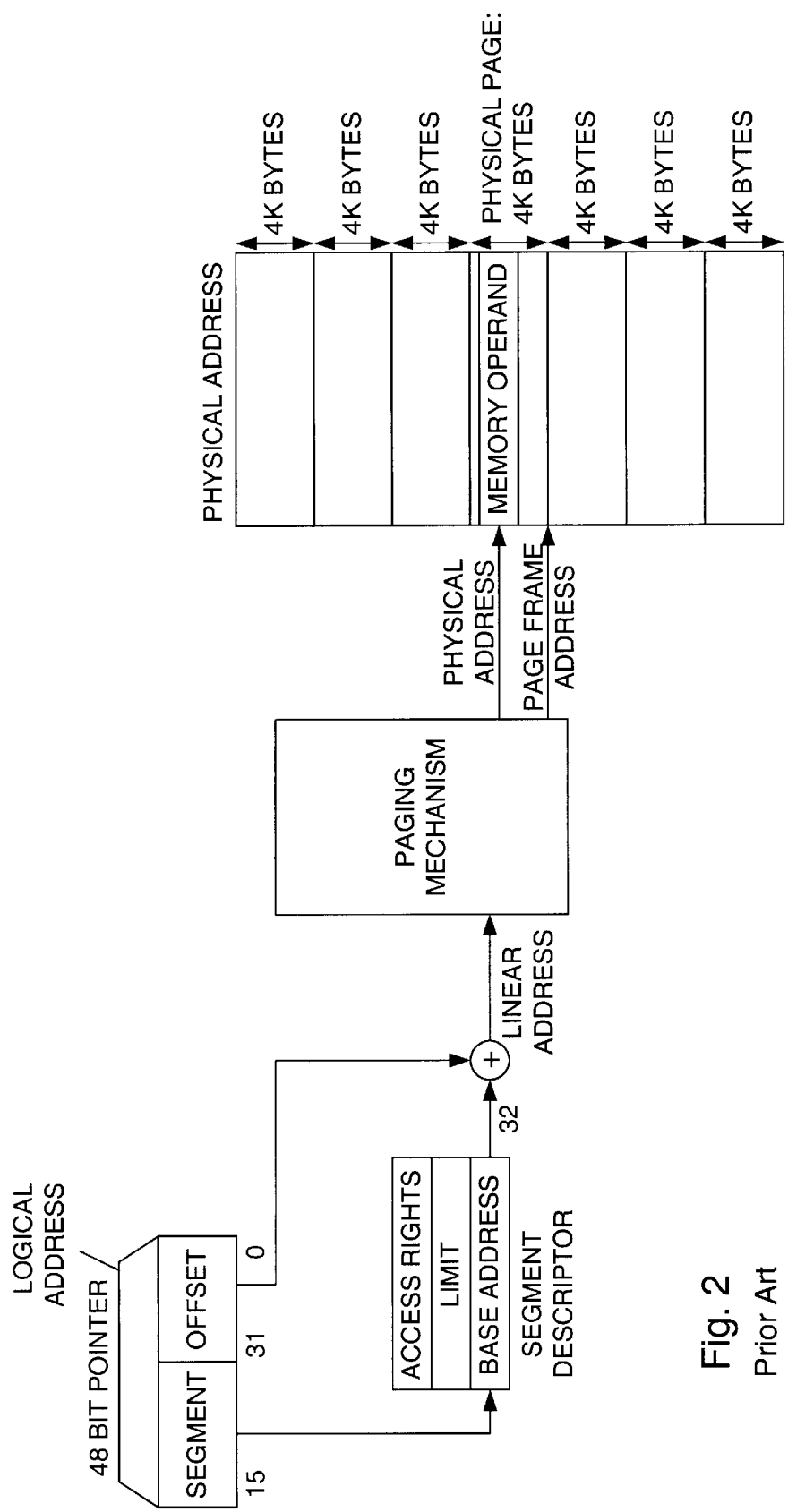
FIG. 2 illustrates in greater detail the address translation occurring in FIG. 1.
Figure 3:
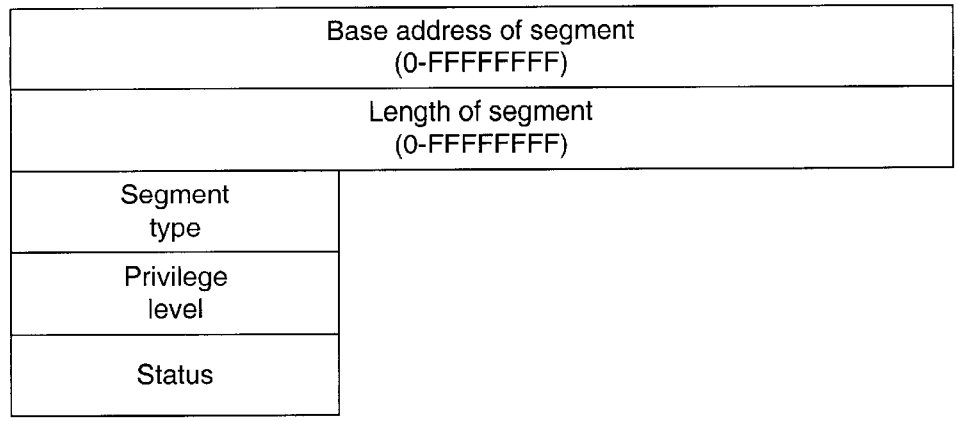
FIG. 3 illustrates the various fields in a segment descriptor.
Figure 4:
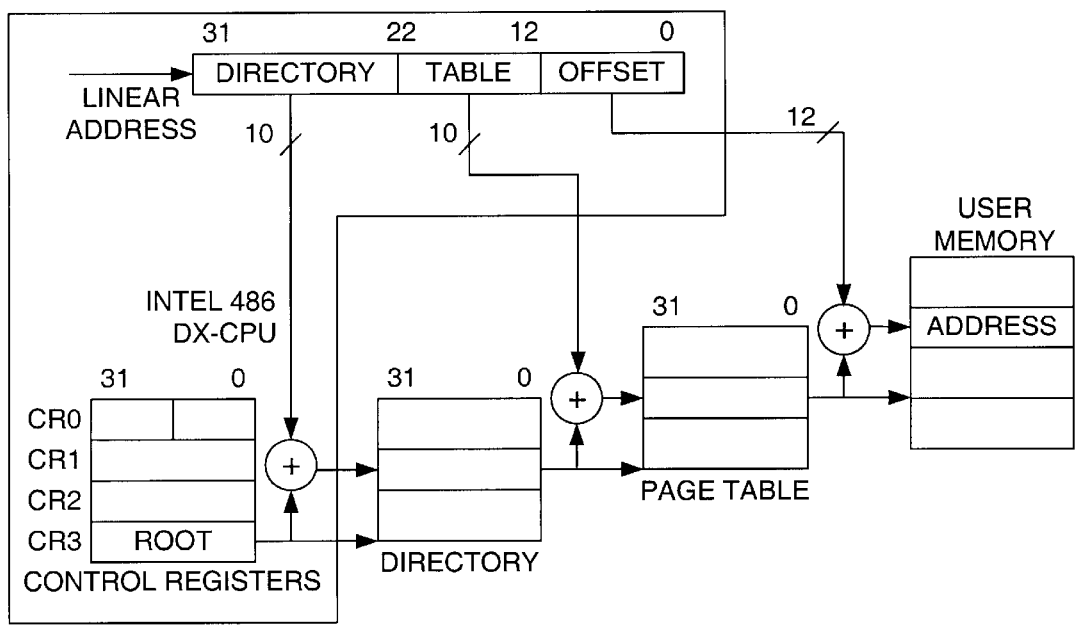
FIG. 4 illustrates operation of the two-level paging mechanism of the MMU.
Figures 5, 6, 7:
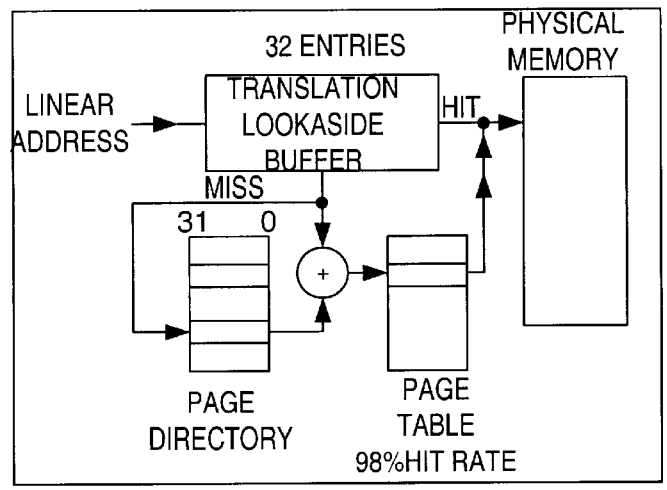
FIG. 5 illustrates the Page Directory Entry which resides in the page directory of FIG. 4.
FIG. 6 illustrates the Page Table Entry which resides in the page table of FIG. 4.
FIG. 7 illustrates the paging operation in the MMU.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the intention is to cover all modifications, equivalents and alternatives falling within the spirit and scope of the present invention as defined by the appended claims.

DETAILED DESCRIPTION OF THE PREFERRED EMBODIMENT

Figure 8:
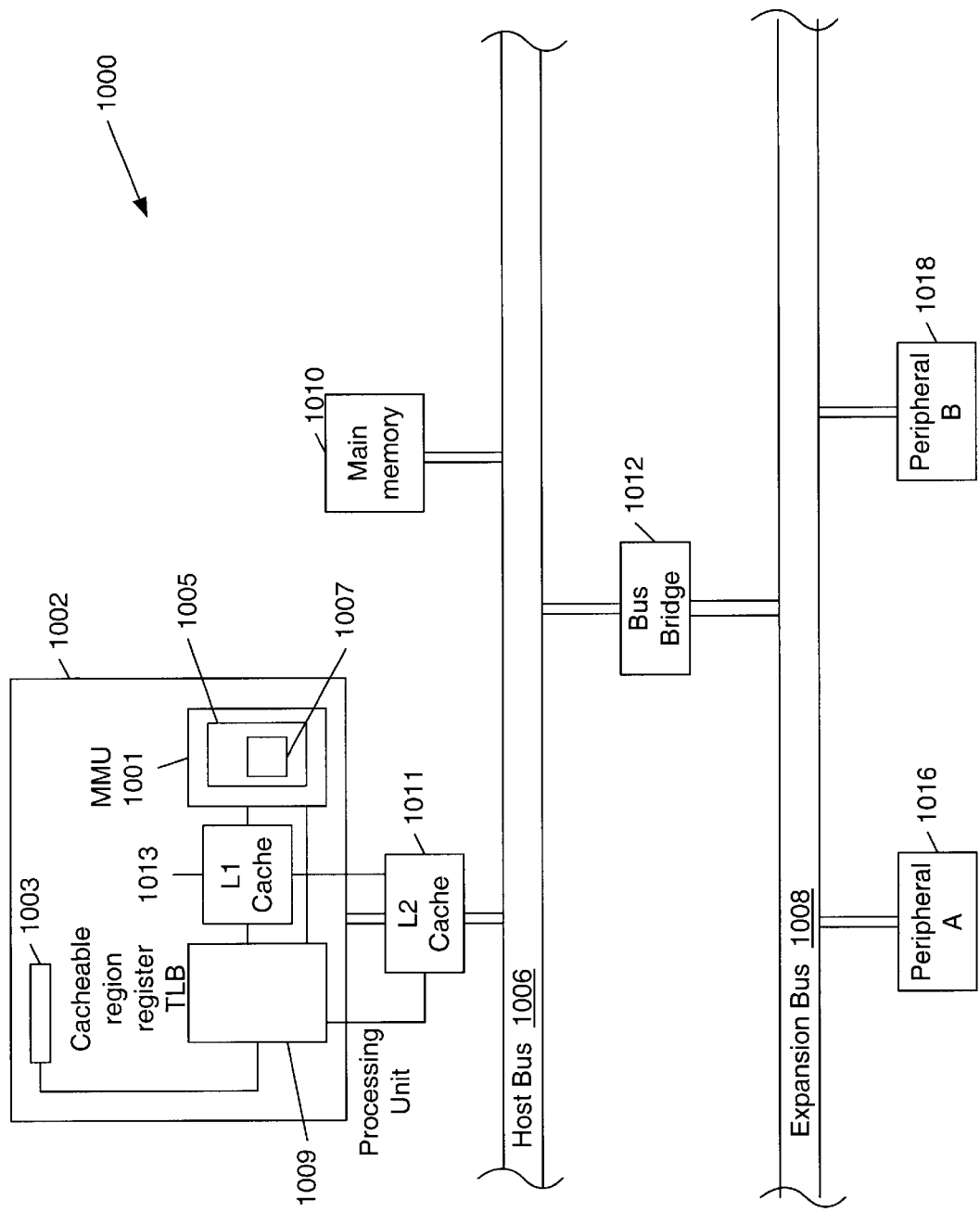
FIG. 8 illustrates a computer system according to the present invention.

Referring now to FIG. 8, a computer system 1000 is shown. The computer system 1000 includes a central processing unit 1002 which is coupled to a CPU local bus 1006. The CPU may be any of a variety of processors, but is preferably an x86 compatible processor. The CPU 1002 includes a processor core (not shown), and a memory management unit 1004 which implements a memory addressing scheme as described in the background section, preferably including both a segmentation unit and paging mechanisms (not shown). Memory management unit 1004 further includes a cacheability unit 1005 for determining whether or not data at a given physical address are cacheable. Cacheability unit 1005 includes a comparator 1007 for comparing a value on a cacheable region register with a memory location to be addressed. CPU 1002 further includes a region register 1003 which provides system level region attribute information including cacheability information. CPU 1002 further includes an L1 cache 1013. CPU 1002 is coupled to CPU local bus 1006 by L2 cache 1011. Main memory 1010 is also coupled to CPU local bus 1006. CPU local bus 1006 is coupled to an expansion or input/output bus 1008 by means of bus bridge 1012. The expansion bus 1008 includes slots for various peripheral devices, 1016, 1018. Expansion bus 1008 may be any of a variety of expansion buses, including a Peripheral Component Interface (PCI) bus, an Industry Standard Architecture (ISA) bus, an Extended Industry Standard Architecture (EISA) bus, or a Microchannel Architecture (MCA) bus.

Figure 9:
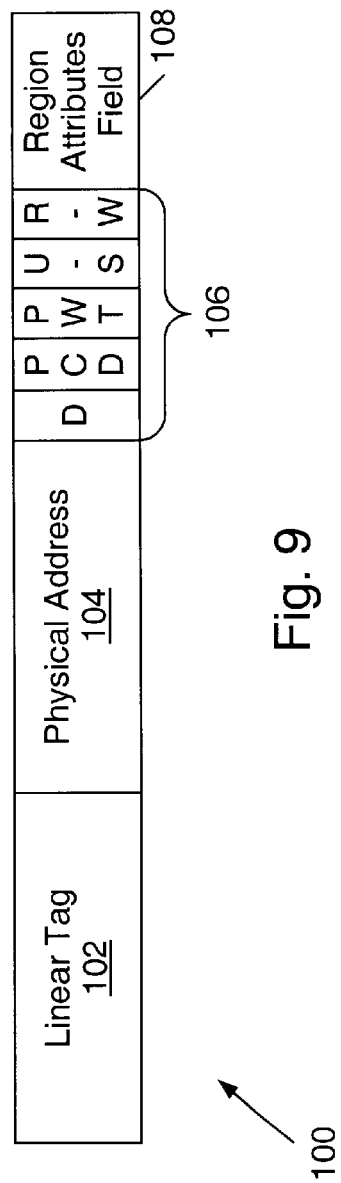
FIG. 9 illustrates a translation entry according to the present invention.

Turning now to FIG. 9, a diagram is shown of a translation entry 100 which stores page attributes as assigned by a region register 1003. Translation entry 100 includes a linear tag field 102, a physical address field 104, a PTE attributes field 106, and a region attributes field 108.

Linear tag field 102 stores a portion of the linear address corresponding to translation entry 100. The portion of the linear address identifies each linear address which is translated by translation entry 100. Therefore, linear tag field 102 stores at most the most significant 20 bits of the 32 bit linear address. More bits would be stored for embodiments employing a linear address which is greater than 32 bits. Linear tag field 102 may store fewer than the most significant 20 bits if some of the bits are inherent in the selection of translation entry 100 for examination. For example, a TLB having 64 rows is indexed by the least significant six bits of the most significant 20 bits of the linear address. Therefore, these bits may be omitted from linear tag field 102. Linear tag field 102 is compared to a corresponding portion of a linear address being translated. If the portions match, a TLB hit is detected. If none of the portions selected from the TLB for examination match, then a TLB miss is detected.

Physical address field 104 stores the physical address corresponding to the linear tag stored in linear tag field 102. For example, physical address field 104 may comprise the 20 most significant bits of the physical address, in embodiments employing 32 bit physical addresses. Physical address field 104 is concatenated with the least significant 12 bits of the linear address to form the translated physical address.

PTE attributes field 106 stores page attributes assigned via the Page Table Entry which is used to translate the linear address corresponding to the linear address tag. For example, the D, PCD, PWT, U/S, and R/W bits from the Page Table Entry may be stored according to one embodiment. PTE attributes field 106 is examined to determine if a particular operation corresponding to the linear address being translated is permitted. For example, if a page is read only (as defined by the R/W bit of field 106), then write operations to the page are not permitted. Additionally, page attributes such as cacheability (the PCD bit) and writethrough/writeback capability (the PWT bit) are stored in PTE attributes field 106. As used herein, a page is a block of memory having addresses which are translated via a particular Page Table Entry. In one embodiment, a page comprises 4 contiguous kilobytes of memory.

Region attributes field 108 stores attributes assigned to the page via region register 1003. As translation entry 100 is being created, the physical address stored in physical address field 104 is compared to a region address stored in region register 1003. If the physical address lies within the region of main memory defined by region register 1003, then attributes stored in region register 1003 are stored into translation entry 100. For example, region register 1003 may define the cacheability (or lack thereof) of a region of main memory. Additionally, region register 1003 may define a region as supporting or not supporting write gathering (wherein a plurality of individual write operations are assembled into a single write operation upon the bus external to CPU 1002). Still further, region register 1003 may define the region as following either writethrough or writeback operation. The memory management unit of CPU 1002 uses both PIE attributes field 106 and region attributes field 108 to control the attributes of the page defined by translation entry 100. For example, if either the PCD bit within PNE attributes field 106 or the cacheability attribute within region attributes field 108 indicate that the page is non-cacheable, then CPU 1002 treats the page as non-cacheable. On the other hand, the page is treated as cacheable by CPU 1002 if both the PCD bit and the cacheability attribute indicate cacheable.

Figure 9A:
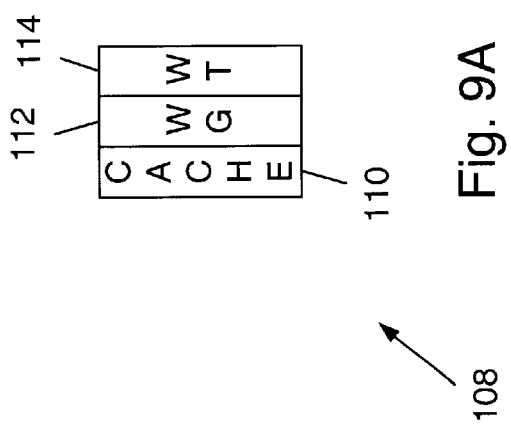
FIG. 9A illustrates one embodiment of a region attributes field.

FIG. 9A illustrates one embodiment of region attributes field 108. As shown in FIG. 9A, region attributes field 108 includes a cacheability attribute 110, a write gathering attribute 112, and a writethrough attribute 114. Cacheability attribute 110 indicates the cacheability of the page translated by translation entry 100. Similarly, write gathering attribute 112 indicates support (or the lack of support) of write gathering within the page. Writethrough attribute 114 indicates the writethrough (or writeback) nature of the page. According to one particular embodiment, each attribute comprises a bit indicative, when set, of support of the corresponding functionality. It is noted that attributes stored in region attributes field 108 may be varied from embodiment to embodiment and may or may not include attributes such as those shown in FIG. 9A.

Figure 10:
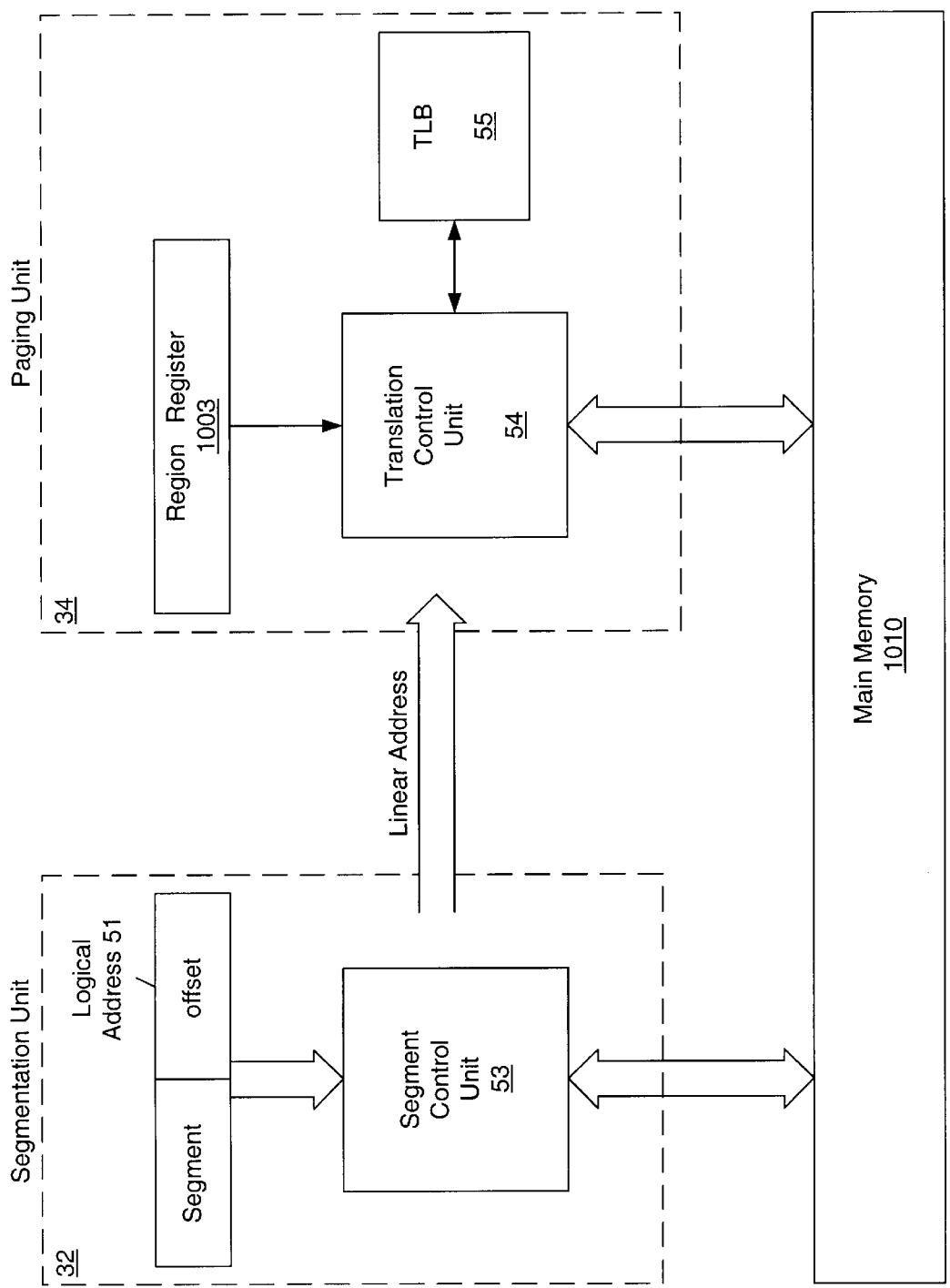
FIG. 10 illustrates the addressing scheme of the computer system of FIG. 8.

The operation of the memory management unit is illustrated in FIG. 10. The segmentation unit 32 of CPU 1002 receives a logical address 51, which includes segment and offset values, from a program. The segment portion indexes into a descriptor in segment descriptor tables which reside in main memory 1010. The segmentation unit 32 includes a segment control unit 53 which combines the base address in the segment descriptor defined by the segment portion of the address and the offset portion of the logical address 51 to form a linear address which is then passed to the paging mechanism 34. Additionally, segment control unit 53 includes a plurality of segment registers for storing recently accessed segment descriptors. Segment control unit 53 is configured to perform segment reload operations, when needed, from main memory 1010.

A translation control unit 54 within paging unit 34 compares the linear address with the linear address tags of translation entries in the translation lookaside buffer (TLB) 55, which caches translation entries of the form shown in FIG. 9. If the entry resides in the TLB 55, referred to as a hit, then the entry is used in conjunction with the linear address to generate a physical address. At the same time, translation control unit 54 determines the cacheability (and potentially other attributes) of the physical address from PTE attributes field 106 and region attributes field 108.

If the entry does not reside in the TLB 55, then translation control unit 54 accesses a page directory and respective page table in main memory 1010 to form the requested translation. This is referred to as a TLB reload. During the reload, translation control unit 54 examines the page table data and the region register 1003 to determine whether or not the data at the address being loaded are cacheable as assigned by region register 1003. Attribute information from region register 1003 is stored into the translation entry formed in response to the TLB miss if the physical address lies within the region identified by the region register 1003. It is noted that multiple region registers may be included in CPU 1002. Translation control unit 54 compares the physical addresses of translations being formed to the region addresses within each of the region registers. Additionally, the region defined by a region register 1003 is larger than a page. In other words, a region includes at least two consecutive pages. According to one embodiment, a region is four consecutive pages. The CPU 1002 also causes certain other status bits in the page directory and page table entries to be updated. The translation thus formed is placed in the TLB 55 and is used to generate a physical address. The physical address is then used to access the respective location in main memory 1010.

Figure 11A:
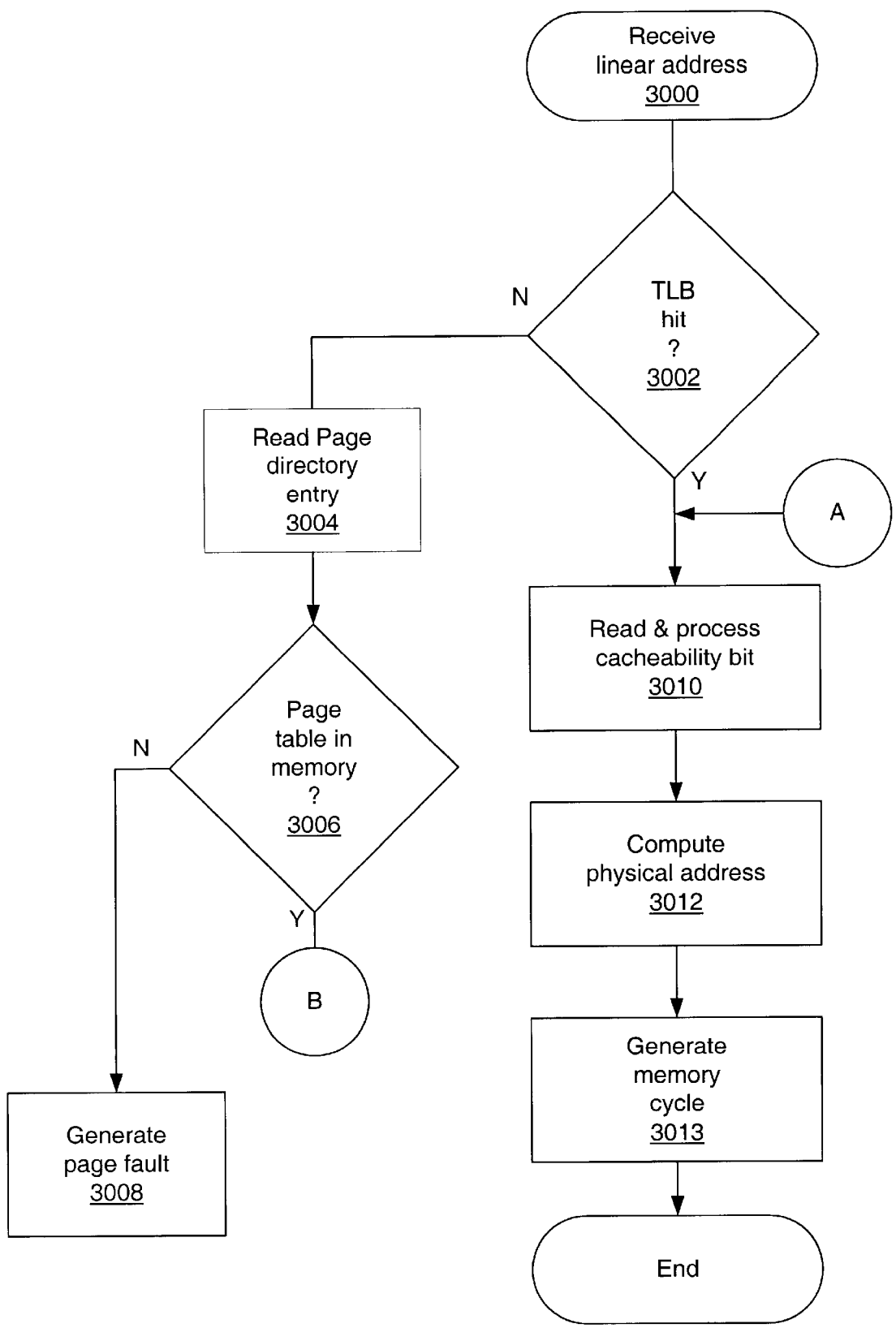
FIG. 11A and 11B illustrate operation of a paging/cacheability mechanism according to the present invention.
Figure 11B:
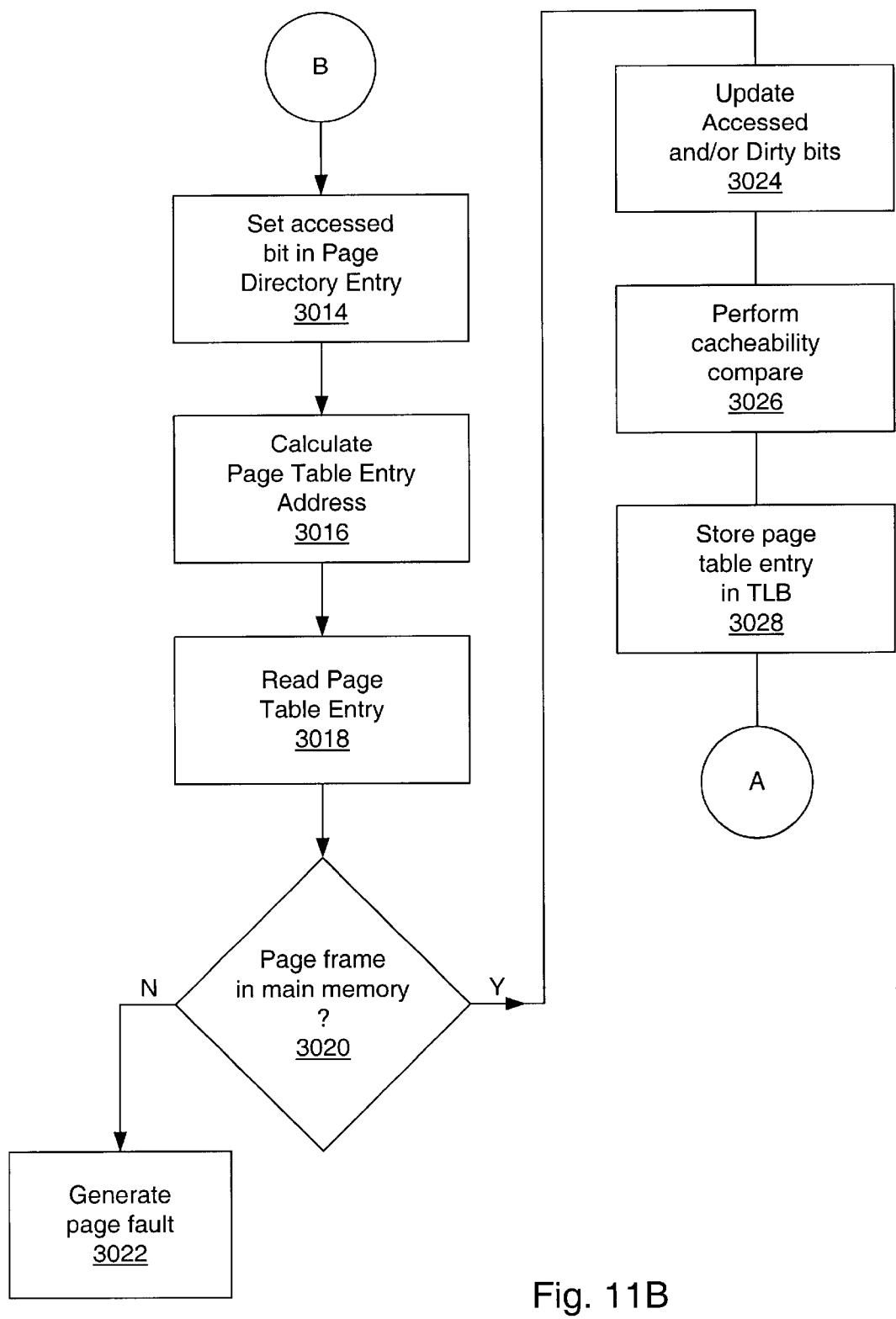

Referring now to FIG. 11A and FIG. 11B, a paging mechanism including an improved cacheability determination mechanism according to the present invention is shown. A linear address is received from the segmentation unit (Step 3000). The upper twenty bits of the linear address are compared with the entries in the TLB to determine if there is a match (Step 3002). If there is a match, referred to as a TLB hit, the cacheability status bit (the setting of which will be described in more detail below) will be output with the page translation and provided to the cache control unit with the physical address to be accessed (Step 3012). Next, in step 3012, the CPU 1002 will calculate the 32-bit physical address using the page frame base address stored in the TLB and the offset from the linear address as described above. In step 3013, the CPU will initiate a bus cycle and place the address on the bus.

If, in step 3002, the requested Page Table Entry is not in the TLB 55, a TLB reload will be performed. In step 3004, the CPU 1002 reads the appropriate Page Directory Entry from memory 1010. The Present bit in the Page Directory Entry is read to determine if the page table is in memory 1010 (step 3006). If the Present bit is 0, indicating that the page table is not in memory, then in step 3008 a page table fault will be generated, which generally causes the requested entry or page frame to be swapped in from disk. If the page table is in fact in main memory in step 3006, then (referring now to FIG. 11B), the CPU will set the Accessed bit in the Page Directory Entry (step 3014). The CPU 1002 will then calculate the Page Table Entry address to access the appropriate Page Table Entry (step 3016). Next, the CPU 1002 will access the Page Table Entry (Step 3018). If the Present bit in the Page Table Entry is 0, indicating that the requested page frame is not in main memory (step 3020), the processor 1002 will generate a page fault which, as discussed above, potentially means that the data will be swapped in from disk. If, in step 3020, the Present bit is set to 1, indicating that the page frame is present in main memory, the CPU 1002 will update the Accessed and/or Dirty bits as necessary (step 3024). Next, the CPU 1002 will perform a cacheability compare with data in the cacheable region register 1003 to determine whether or not the data at the desired location are cacheable (Step 3026). As noted above, this could be done on a page frame basis or at the page directory level. If the data are cacheable, the cacheability bit will be set and the translation entry will be stored in the TLB 55 (Step 3028).

Once the TLB 55 has been updated (referring once again to FIG. 11A), the cacheability bit will be read (step 3010), the physical address will be generated (step 3012), and a memory cycle will be generated (step 3013). It is noted that steps 3010, 3012, and 3013 may be performed in parallel with updating the TLB.

Although the method and apparatus of the present invention has been described in connection with a preferred embodiment, it is not intended to be limited to the specific form set forth herein, but on the contrary, it is intended to cover such alternatives, modifications, and equivalents as can be reasonably included within the spirit and scope of the invention as defined by the appended claims.

What is claimed is:

1. A processor comprising:
   a region register defining a physical address region and including an attributes field defining at least one memory attribute of the physical address region;
   a translation lookaside buffer (TLB) comprising a plurality of entries, each of the plurality of entries storing a linear address tag and a corresponding physical address defining a page of memory to which linear addresses matching the linear address tag translate, each of the plurality of entries also configured to store an indication of the at least one memory attribute from the region register if the physical address is within the physical address region; and
   a translation control unit coupled to the region register and the TLB, wherein the translation control unit is configured, in response to a miss in the TLB for a first linear address, to: (a) locate a translation corresponding to the first linear address within a plurality of page tables in a main memory, the translation defining a first physical address corresponding to the first linear address, (b) compare the first physical address with the physical address region defined by the region register, (c) store the first physical address in a first entry of the plurality of entries of the TLB, and (d) store the indication of the at least one memory attribute from the region register in the first entry if the first physical address is within the physical address region;
   wherein the at least one memory attribute is independent of the translation.

2. The processor as recited in claim 1 wherein, in response to a second linear address which hits in a second entry of the plurality of entries in the TLB, the TLB is configured to provide the indication of the at least one memory attribute from the second entry.

3. The processor as recited in claim 1 wherein the physical address region includes at least two pages.

4. The processor as recited in claim 1 wherein the at least one memory attribute includes a cacheability attribute defining a cacheability of the physical address region.

5. The processor as recited in claim 4 wherein each of the plurality of entries is further configured to store a second cacheability attribute from translations in the plurality of page tables.

6. The processor as recited in claim 1 wherein the at least one memory attribute includes a write gathering attribute defining whether or not write gathering is supported within the physical address region.

7. The processor as recited in claim 1 wherein the at least one memory attribute includes a write through attribute defining whether or not the physical address region is write through.

8. The processor as recited in claim 7 wherein each of the plurality of entries is further configured to store a second write through attribute from translations in the plurality of page tables.

9. The processor as recited in claim 1 wherein the at least one memory attribute includes a cacheability attribute, a write gathering attribute, and a write through attribute.

10. A method comprising:
    locating a translation corresponding to a first linear address within a plurality of page tables in a main memory, the translation defining a first physical address corresponding to the first linear address;
    comparing the first physical address with a physical address region defined by a region register which further includes an attributes field defining at least one memory attribute of the physical address region;
    storing the first physical address in a first entry of a plurality of entries of a translation lookaside buffer (TLB); and
    storing an indication of the at least one memory attribute from the region register in the first entry if the first physical address is within the physical address region;
    wherein the at least one memory attribute is independent of the translation.

11. The method as recited in claim 10 further comprising:
    detecting a hit in a second entry of the plurality of entries in the TLB; and
    providing the indication of the at least one memory attribute from the second entry in the TLB responsive to the detecting.

12. The method as recited in claim 10 wherein the physical address region includes at least two pages.

13. The method as recited in claim 10 wherein the at least one memory attribute includes a cacheability attribute defining a cacheability of the physical address region.

14. The method as recited in claim 13 further comprising storing a second cacheability attribute from the translation in the first entry in addition to the cacheability attribute.

15. The method as recited in claim 10 wherein the at least one memory attribute includes a write gathering attribute defining whether or not write gathering is supported within the physical address region.

16. The method as recited in claim 10 wherein the at least one memory attribute includes a write through attribute defining whether or not the physical address region is write through.

17. The method as recited in claim 10 further comprising storing a second write through attribute from the translation in the first entry in addition to the write through attribute.

18. The method as recited in claim 10 wherein the at least one memory attribute includes a cacheability attribute, a write gathering attribute, and a write through attribute.

\* \* \* \* \*

UNITED STATES PATENT AND TRADEMARK OFFICE
CERTIFICATE OF CORRECTION

PATENT NO. : 6,304,944 B1
DATED : October 16, 2001
INVENTOR(S) : Michael Pedneau It is certified that error appears in the above-identified patent and that said Letters Patent is hereby corrected as shown below:

<u>Column 10, claim 17,</u>
Line 60, please delete "10" and insert -- 16 -- in place thereof.

Signed and Sealed this

Second Day of April, 2002

Attest:

JAMES E. ROGAN
*Attesting Officer*     *Director of the United States Patent and Trademark Office*